Feb. 21, 1933.   A. D. ROBBINS   1,898,313
WHEEL AND BRAKE FOR MOTOR VEHICLES
Filed July 14, 1928   3 Sheets-Sheet 3

INVENTOR
Azad D. Robbins
BY Chas. M. C. Chapman
ATTORNEY

Patented Feb. 21, 1933

1,898,313

UNITED STATES PATENT OFFICE

AZOR D. ROBBINS, OF NEW YORK, N. Y., ASSIGNOR, BY MESNE ASSIGNMENTS, TO BENDIX AVIATION CORPORATION, OF SOUTH BEND, INDIANA, A CORPORATION OF DELAWARE

WHEEL AND BRAKE FOR MOTOR VEHICLES

Application filed July 14, 1928. Serial No. 292,727.

This invention relates to the art of motor vehicles, and particularly has reference to wheel and brake constructions especially adapted for trucks and heavy commercial vehicles. The invention includes several features of construction which enable the braking mechanism to perform its functions smoothly, effectively and without the exertion of undue manual power.

It is among the objects of my invention to provide a friction brake which is simple and effective in construction, economical to produce, requires little effort to operate, can be kept thoroughly lubricated, and the lubricant economized and prevented from leaking or spreading over the mechanism. It is also an object of my invention to provide a brake and wheel-structure which is strong, the parts of which can be readily assembled and dissociated when required for inspection and repair, and which affords a powerful drive and, in consequence, hold-back when the brake is operated. Other objects are to so house the brake mechanism and hub-cap and contained structure as to provide a compact, strong and durable wheel and brake and prevent the brake and hub from being injured; to enable a very positive and strong braking action to be obtained with a minimum of wear upon the parts; to provide a stationary oil-retaining housing at the end of the axle, and means to enable the wheel to be removed without disturbing the oil-seal; to provide a structure by which the wheel can be readily removed and replaced without removing or disturbing the brake mechanism which, though housed and protected by the wheel, is mounted independently of the latter; and to provide a pressure-plate or pad so arranged and constructed as to enable it to be forcefully pressed against the friction disks of the brake mechanism with an equal distribution of braking pressure, thus avoiding unequal wear and providing for powerful and effective braking action.

With the above objects in view and others which will be detailed during the course of this description, my invention consists in the parts, features, elements and combinations thereof hereinafter described and claimed.

In order that my invention may be clearly understood, I have provided drawings wherein.

Figure 1:
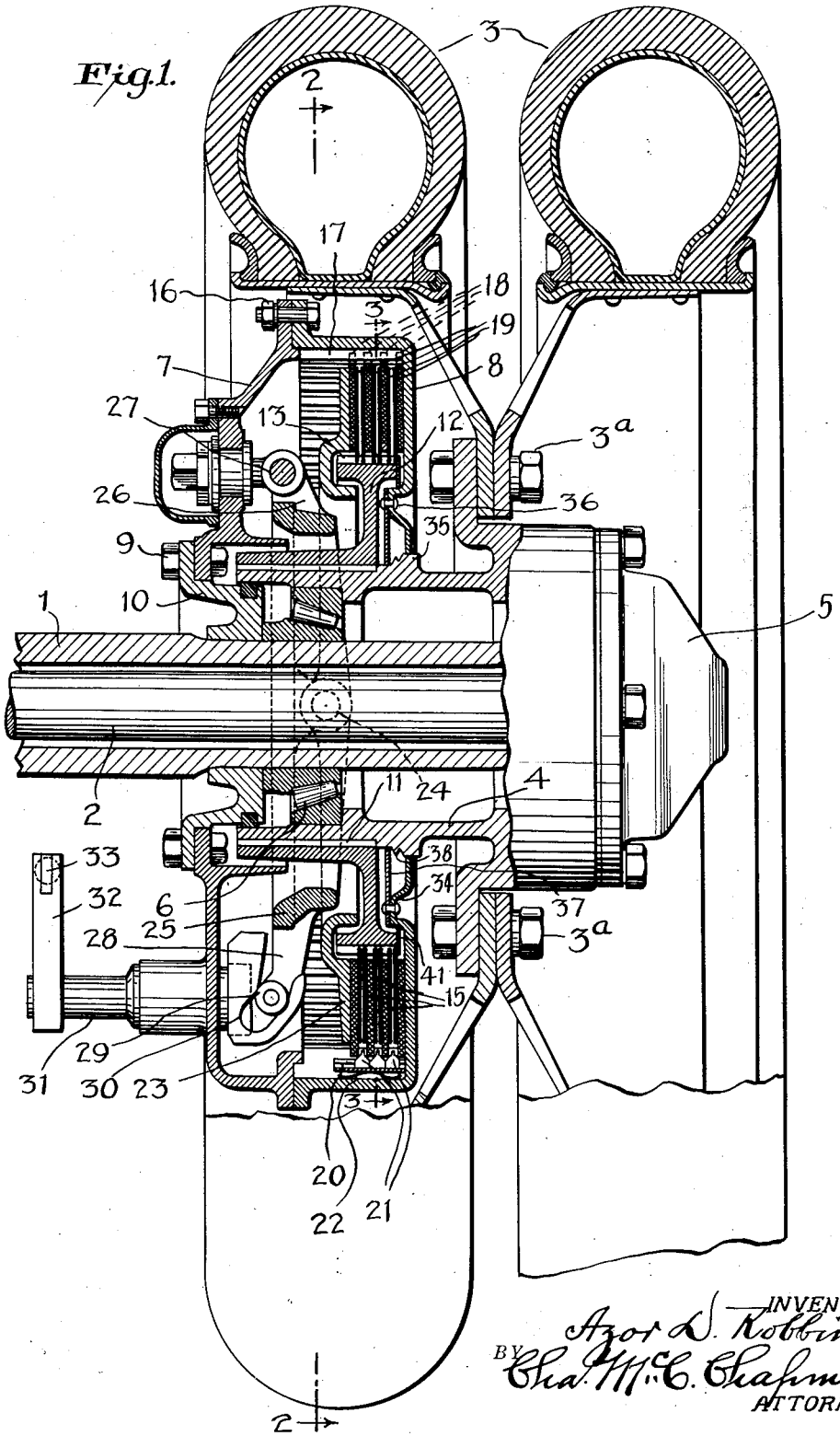
Figure 1 is a view in sectional elevation taken on the line 1—1 of Figure 2.

Referring to the drawings, the numeral 1 indicates the stationary housing or casing for the driven axle 2. The axle 2 may be driven from the ordinary differential of the car, or any other suitable mechanism. A pair of wheels 3, 3, comprising ordinary tires and rims, have their webs bolted together and secured at 3ª to the flange of a hub member 4. This member 4 has a cap 5 secured to it and the cap is keyed or splined to the outer end of the axle 2 in the conventional way, so that, when the axle 2 is driven, the wheels 3 will revolve. Roller bearings 6 and other roller bearings (not shown), enclosed by the cap 5, are located between the stationary casing 1 and the member 4.

The hub member 4, which is journaled on the casing 1, and driven by the axle 2, as heretofore explained, extends into a stationary two-part housing comprising the body portion 7 and cover 8. The body portion 7 is bolted or otherwise secured at 9 to a member 10, which is mounted on the stationary casing 1. Splined or otherwise secured at 11 to the inwardly extending part of the member 4 is a flanged member 12 having teeth or projections 13 on its outer periphery. These teeth engage similar teeth or projections 14 on compound friction disks 15. The disks 15 are preferably formed of two steel plates separated by spacing members so as to provide passage for a lubricant and cooling medium.

The cover 8 of the stationary housing is bolted at 16 to the body portion 7 and is provided with internal teeth or projections 17 which engage similar teeth or projections 18 on friction disks 19. The disks 15 are mounted between the friction disks 19. It will be noted that the disks 15 are driven by the flanged member 12 and the friction disks 19 are held against rotation in the stationary housing. However, all of the disks are free to move axially or longitudinally relatively to the housing 1 and axle 2. When the disks 15 and 19 are forced together, a braking effect is produced, and when they are separated the wheels 3 may revolve freely.

Means are provided for forcing the disks together when desired and for positively separating them when the pressure is removed. The separating means are generally indicated at 20, Figures 1 and 2, and comprises a plurality of wedges 21, which are normally forced between the friction disks 19 by springs 22. Separating means 20 may be located at a plurality of points about the cover 8, see Figure 3.

Figure 2:
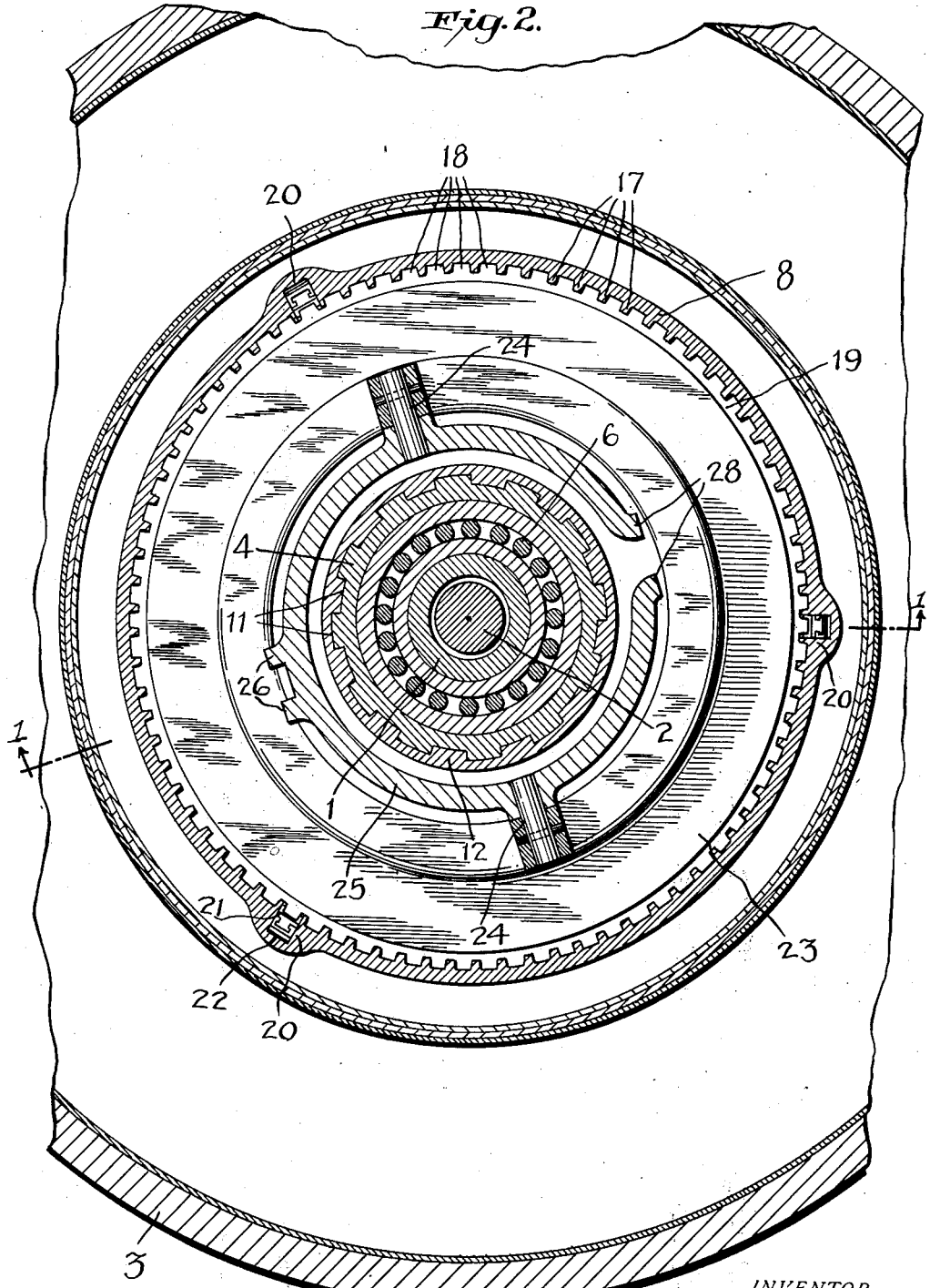
Figure 2 is a cross-sectional view taken on the line 2—2 of Figure 1.
Figure 3:
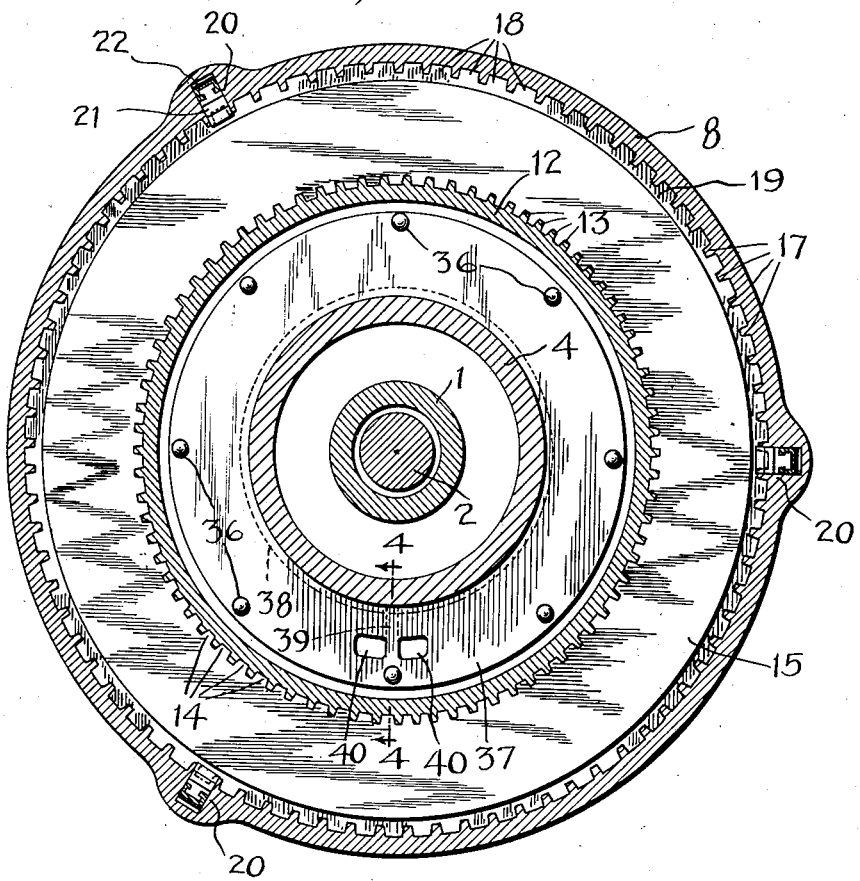
Figure 3 is a cross-sectional view taken on the line 3—3 of Figure 1.

The means for forcing the disks together comprise a pressure plate or circular pad 23, which bears against the inner friction disk 19, and presses the plates or disks 15 and 19 together and against the cover 8 of the stationary housing. This pressure part of plate 23 is annular and of approximately the same area as the friction disks, so as to exert an even pressure on all parts of the disks, and is pivoted at 24, at two opposite points, to a lever 25. This lever 25, as shown particularly in Figures 1 and 2, is annular and surrounds the members 4 and 12. It has projecting ears 26 which are pivoted on an adjustable pin 27, mounted in the body portion 7 of the stationary housing. Ears 28, diametrically opposite the pivot 27, carry a roller 29, which is engaged by a cam 30 mounted on one end of a shaft 31.

The details of the pressure applying means and the adjustable pivot 27 are not disclosed herein in detail. It is sufficient, with the disclosure herein, to state that my pressure pad or plate 23 is applied to the friction disks with adjustable and uniform pressure for purposes of my invention.

Secured on the shaft 31, outside of the stationary housing, is a crank-arm 32 which has pivoted to it the rod 33 which leads to the brake foot pedal. There might be separate rods leading from the two rear wheels to the foot pedal, or the rods might be connected to a suitable toggle mechanism so as to synchronize the action of the brakes on both wheels.

Figure 4:
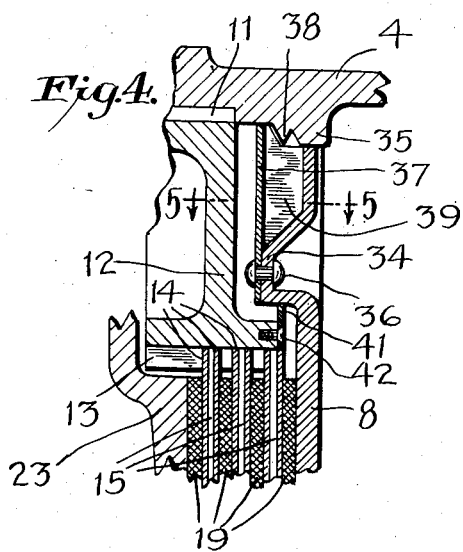
Figure 4 is a fragmentary sectional view on a larger scale showing the oil-retaining seal, this view being taken on line 4—4 of Figure 3.
Figure 5:
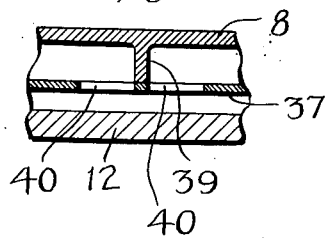
Figure 5 is a fragmentary, detail, sectional view taken on the line 5—5 of Figure 4.

The stationary housing 7—8 is adapted to contain oil for lubricating purposes, and it is necessary that a seal be provided at the outer face of the housing. This seal is advantageouly made by forming the cover plate 8 with an inwardly extending, central, open part 34. The inner circumference of the cover plate, adjacent this inwardly extending part 34, contacts with a circumferential enlargement 35 on the hub member 4. Riveted at 36 to the part 34 is an open plate 37 which contacts with a somewhat reduced portion of the hub member 4. Between the cover plate 8 and the plate 37, the hub member 4 is provided with a sharp circumferential rib 38, extending into the chamber between the plates 8 and 37. A rib or lug 39, preferably formed integral with the cover plate 8, and particularly illustrated in Figures 3, 4 and 5, conforms to the shape of the rib 38, and is located at the lower part of the stationary housing within said chamber. As the hub 4 rotates, the rib or lug 39 will brush or wipe the oil from the circumferential rib 38, and said oil will pass through the openings 40 into the main part of the stationary housing for reuse. Another oil-retaining ring 41, Figures 1 and 4, may be secured by screws 42 to the flanged member 12. By virtue of the ring 41 and the structure just described, an effective oil-retaining seal is provided.

From the foregoing description, it will be seen that I have provided a strong durable, economical-to-produce wheel and brake structure, wherein the wheel can be readily removed and replaced without disturbing the braking mechanism or the oil-sealing structure. The wheel will slide readily into place upon the axle by reason of the hub-structure; oil is not wasted, is automatically reused, and cannot be flirted upon the wheel or brake mechanism. The brake parts and hub are housed in the wheel, the latter affording protection for the parts by preventing them from striking obstructions. A powerful braking action can be obtained at all times, since adjustable pressure can be imposed upon the pressure pad and the latter will transmit such pressure uniformly, avoiding uneven wear by unbalanced pressure upon the friction disks and cover plate 8 of the housing. Moreover, the braking action is powerful, and at the same time positive. These features are important.

It is to be understood that various forms of the invention other than that described above may be made without departing from the spirit of the invention or the scope of the subjoined claims.

Having thus described my invention, what I claim and desire to secure by Letters Patent is:

1. In combination with the wheel of a motor vehicle, having a live axle and a stationary casing, a hub member carried by the casing, a wheel mounted on the hub member, and means enabling the wheel to be removed from the casing without disturbing other parts.

2. In combination with the wheel of a motor vehicle having a live axle and a stationary casing, the said wheel being mounted on the casing, a brake mechanism surrounding the casing, and means whereby the wheel may be removed from the casing without disturbing the brake mechanism.

3. In combination with a wheel for motor vehicles, including stationary casing on which the wheel is mounted, a brake mechanism surrounding the casing, a housing for the brake mechanism, and oiling means carried by the housing and including a wiper for preventing the oil from flirting or spreading.

4. In combination with the wheel of a motor vehicle carrying a hub mounted on a stationary casing, a brake mechanism surrounding the hub, a housing for the brake mechanism, and oiling means carried by the housing comprising a chamber and a wiper mounted in the chamber for preventing the oil from flirting or spreading, the brake mechanism and oiling means being thus independent of the wheel.

5. In combination with a vehicle wheel carrying a hub adapted to surround a live axle, said hub carrying a splined member, a brake mechanism including said splined member, whereby the wheel and hub may be removed without disturbing the brake mechanism.

6. In combination with a vehicle wheel carrying a hub adapted to surround a live axle, said hub carrying a splined member, a brake mechanism including said splined member, a housing inclosing said brake mechanism, oiling means carried by the housing, and interacting with the hub, whereby the wheel may be removed without disturing the brake mechanism or the oiling means.

AZOR D. ROBBINS.